July 12, 1955     A. D. WOOTEN     2,713,097
ACCELEROMETER

Filed Aug. 28, 1953     4 Sheets-Sheet 1

INVENTOR.
Allen D. Wooten
BY

INVENTOR.
Allen D. Wooten
BY
Roland A. Anderson

July 12, 1955  A. D. WOOTEN  2,713,097
ACCELEROMETER

Filed Aug. 28, 1953  4 Sheets-Sheet 3

INVENTOR.
Allen D. Wooten
BY
Roland A. Anderson

United States Patent Office 2,713,097
Patented July 12, 1955

2,713,097

ACCELEROMETER

Allen D. Wooten, Falls Church, Va., assignor, by mesne assignments, to the United States of America as represented by the United States Atomic Energy Commission Application August 28, 1953, Serial No. 382,501

13 Claims. (Cl. 200—61.53)

The present invention relates to new and improved means adapted to operate a switch or other mechanism at some preselected velocity which is determined by the time integration of acceleration.

With some vehicles, for example, an airplane, it is desirable to provide means for automatically establishing or controlling an electric circuit in response to acceleration of the vehicle or upon attainment of some predetermined velocity by the carrying vehicle. It may, for example, be desired to close a switch when the vehicle has reached some preselected velocity or to operate a potentiometer so as to continuously indicate velocity. Devices for performing such functions are generally known as accelerometers.

An object of the present invention is to provide new and improved means adapted to be utilized for operating a switch or other mechanism upon attainment of desired velocity by a carrying vehicle.

Another object of the invention is to provide a new and improved accelerometer which embodies means for providing an amplified output motion in response to motion of another part of the accelerometer.

Another object of the invention is to provide an accelerometer which embodies new and improved presettable means for operating a switch upon attainment of desired velocity.

Still another object of the invention is to provide a new and improved accelerometer of compact construction.

A still further object of the invention is to provide an improved accelerometer of relatively simple construction and operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

In the accompanying drawings.

Figure 1:
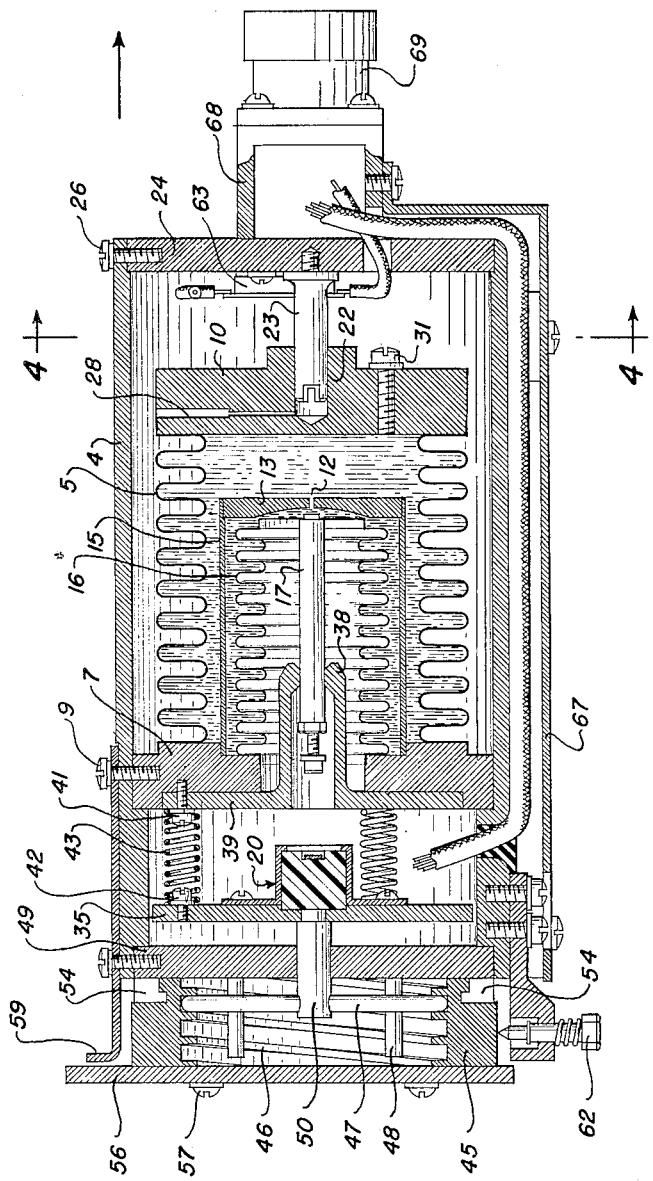
Fig. 1 is a longitudinal sectional view showing a preferred embodiment of the present invention.
Figure 2:
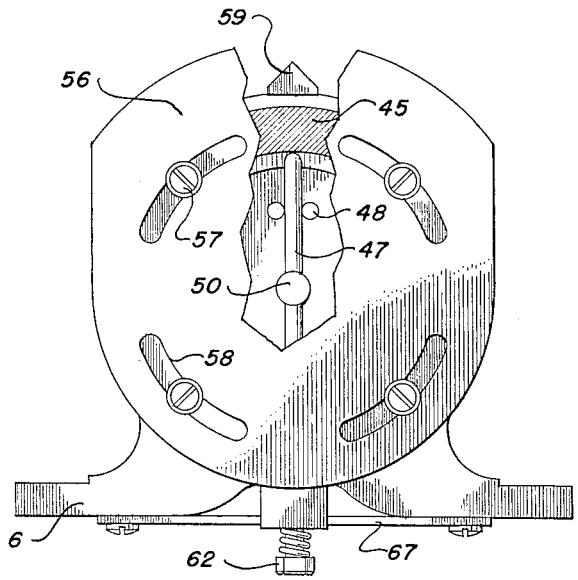
Fig. 2 is a view, partly broken away, of the left end of the device illustrated in Fig. 1.
Figure 3:
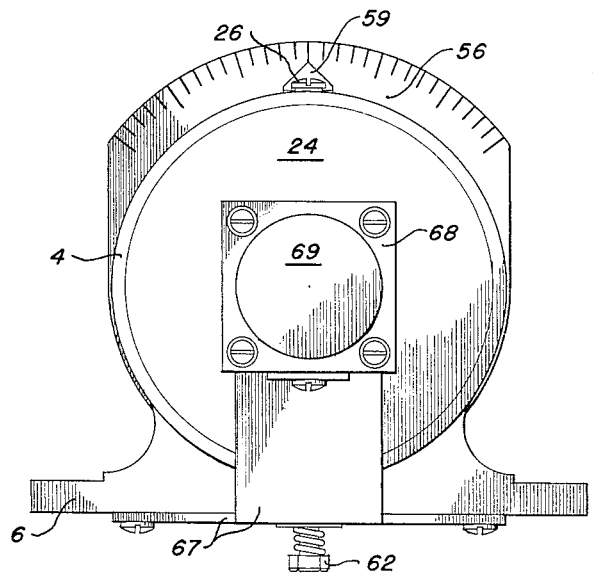
Fig. 3 is a view showing the right end of the device illustrated in Fig. 1.
Figure 4:
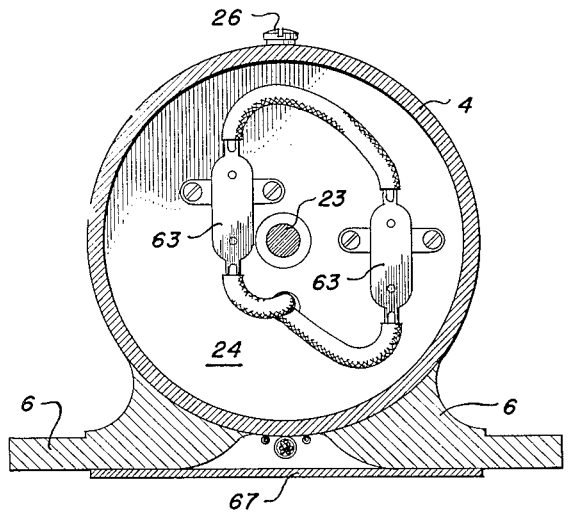
Fig. 4 is a sectional view, taken along line 4—4 of Fig. 1.

As shown more particularly in Figs. 1 through 4, the present device comprises generally an outer casing 4 enclosing an outer metallic bellows 5 that is secured to a mounting plate 7 and has a mass 10 attached adjacent an opposite end. The mass 10 is movable toward the mounting plate 7 to at least partially compress the outer bellows 5 and force fluid therefrom through an aperture 12 of a plate 13, to a space between the interior of an inner casing 15 and the exterior of an inner metallic bellows 16. The inner bellows 16 is secured to the mounting plate 7 and carries adjacent an opposite closed end thereof a rod or trigger 17; fluid forced into the volume between the inner casing 15 and the inner bellows 16 at least partially collapses the inner bellows and moves the trigger 17 toward a contact blade or member of a switch 20. The accelerometer is normally installed in a vehicle with the mass 10 disposed toward the front of the vehicle so that as the vehicle accelerates toward the right (in the direction of the arrow) "setback" or inertia causes the mass 10 to tend to remain at rest or lag behind movement of the casing 4, to thereby compress the outer bellows and force fluid through aperture 12 to compress the inner bellows and move the end of the trigger member toward the switch 20 and its contact blade, to thereby operate the switch and close a circuit.

Means is shown adjacent the left end of the outer casing 4 for adjusting the switch 20 toward or away from the mounting plate 7 and trigger rod 17, so as to thereby vary the distance through which trigger 17 must move prior to operating the switch 20. It is believed that the foregoing general description will facilitate understanding of the following more detailed description.

The outer casing 4 may be cylindrical and provided with apertured mounting feet or brackets 6 to facilitate securing to a vehicle, the normal mounting position being along a fore and aft axis of a vehicle with the movable mass 10 disposed toward the front and the bellows 5 and 16 positioned rearwardly thereof so that as the vehicle moves forward the mass 10 tends to compress the bellows to which it is secured. The mounting plate 7, to which are soldered or otherwise secured the outer and inner bellows, may rest against a supporting shoulder of the outer casing and be fixedly secured to the outer casing by bolts 9 or otherwise.

The movable mass 10 is preferably provided with a recess 22 into which projects a guide pin 23 that is in turn threaded into or otherwise secured to an end plate 24 of the outer casing. The end plate 24 may rest against a shoulder formed on the outer casing and be secured in position by bolts 26.

The movable mass 10 may have a generally radially extending opening 28 to provide free communication between the interior of the recess 22 and the interior of the outer casing 4 and thereby minimize the possibility of partial vacuum in the recess 22 interfering with movement of the mass 10 along the guide pin 23.

A filling opening, normally closed by a threaded plug 31, may be provided in the mass 10 to facilitate filling the bellows 5 and volume between inner casing 15 and inner bellows 16 with some suitable fluid, for example, silicone fluid or oil.

The apertured plate 13 through which fluid is forced in response to movement of the mass 10 toward the mounting plate 7 is carried by the imperforate inner casing member 15 that is fixedly secured to the mounting plate 7. The mounting plate 7, inner casing 15, and apertured plate 13 thus cooperate to form an inner chamber, within the outer bellows, which encloses the inner bellows 15.

The inner bellows may be silver soldered to the mounting plate 7 and its opposite or free end may be silver soldered or otherwise securely attached to the trigger rod or member 17, so that collapsing or subsequent elongation of the inner bellows 16 is effective to move the trigger member longitudinally. When the mass 10 moves toward the left (Fig. 1) in response to movement of the entire accelerometer toward the right, the outer bellows partially collapses and fluid flows through the aperture 12 to the exterior of the inner bellows and at least partially collapses the latter bellows so as to move the trigger member 17 and its left end portion toward the operating blade of switch 20 that is secured by an apertured bracket to a mounting plate 35. The switch is preferably of the snap-acting type. The time required to move the left end of the trigger into contact with the switch blade will, in general, be dependent upon the magnitude of the accelerating forces acting along the fore and aft axis of the vehicle which carries the accelerometer and the period of time during which the accelerating force is applied; with relatively high accelerations a lesser period of time will be required to force sufficient liquid through the aperture 12 to move the trigger end into contact with the switch blade than will be required at lower acceleration. If a lower rate of acceleration continues for a sufficient period of time, enough fluid will be forced through the aperture 12 to eventually move the trigger end into contact with the blade of switch 20.

The trigger member 17 is preferably mounted and maintained in alignment with the switch contact member by an elongated trigger guide member 38 that has a flange 39 seated in a recess of the mounting plate 7 and is secured to the mounting plate by bolts 41.

Disposing one bellows within the other as disclosed provides a very compact construction and the smaller "secondary" bellows responds quickly and with amplified output motion as compared with motion of the "primary" or outer bellows and its movable mass, thus affording better resolution than if bellows of the same size were employed.

The stiffness or resiliency of the inner and outer bellows, weight of the movable mass, size of the aperture 12, and viscosity of liquid in the outer bellows may be of any suitable values, depending upon the particular conditions and accelerations under which the device is to be used. The bellows will normally be of sufficiently low stiffness as not to objectionably impede movement of the mass.

When filling the bellows with liquid it is desirable that all air be removed from the volume included between the interior of the outer bellows and the exterior of the inner bellows for the reason that air is compressible and if it remains within this volume it tends to interfere with accuracy.

Means is shown at the left of Fig. 1 for varying the instant at which the trigger end contacts and operates the blade of switch 20. The plate member 35 which carries the switch 20 rests, at spaced intervals, against compression springs 43 that may abut against the trigger guide flange 39 or mounting plate 7; these compression springs may be maintained in position by having their opposite end portions fit over the heads of bolts 41, 42. The springs 43 normally urge the switch mounting plate member 35 away from the mounting plate 7 and trigger member 17.

Movement of the mounting plate 35 and the switch 20 with its contact member toward or away from the adjacent end of trigger member 17 is achieved by rotating an adjusting ring 45 which connects with the switch adjusting plate member 35 through the intermediation of threads 46 (preferably of the double thread type), control pin 47, guide posts 48 carried by end plate 49, and connecting member 50 that has an aperture through which the control pin 47 extends and which is brazed or otherwise secured adjacent one end thereof to the plate member 35. The adjusting ring 45 may be rotatably connected to the end plate 49 by a pair of semicircular members 54 which fit into an annular groove of the adjusting ring and have shoulder portions projecting radially inwardly over cooperating shoulder portions of the adjusting ring; the semicircular members may be bolted to the end plate 49, these latter bolts being accessible through openings (not shown) in the adjusting ring 45. By the foregoing construction, the adjusting ring 45 is free to be rotated so as to correspondingly rotate its interiorly threaded portion 46; end portions of the control pin 47 project into the thread grooves and as the adjusting ring is rotated, the control pin is caused to move toward or away from the end plate 49, depending upon the rotation of the adjusting ring. The control pin cannot turn with the adjusting ring as it is held against rotation by the guide posts 48 which may be press-fitted to the end plate 49, that is in turn fixedly positioned on the outer casing 4. Due to the fact that the control pin extends through an aperture in the connecting member 50, when the control pin is moved toward the right (Fig. 1), the switch supporting plate member 35 is also moved toward the right so as to position the switch contact member closer to the adjacent end of the trigger member 17, and hence the switch is adapted to be operated at an earlier instant. Rotating the adjusting ring in an opposite direction allows the compression springs 43 to press the switch mounting plate 35 together with the switch further away from the trigger member and thus effect switch operation by the trigger member at a later instant, as the mass must move farther and force more fluid from the outer bellows through the aperture 12.

A suitably calibrated dial plate 56 may be secured to the adjusting ring, for example, by bolts 57 which extend through elongated slots 58, and a reference pointer 59 may be secured to the outer casing 4. After being calibrated by adjusting the adjusting ring and dial plate, the bolts 57 may be tightened so as to firmly clamp the dial plate in position against the adjusting ring; thereafter these latter two members may be rotated together with respect to the reference marker 59 so as to preset the device to operate upon reaching a desired velocity.

Preferably the periphery of the adjusting ring has a knurled or roughened surface for cooperating with a lock assembly 62 to retain set positions of the adjusting ring.

Figure 5:
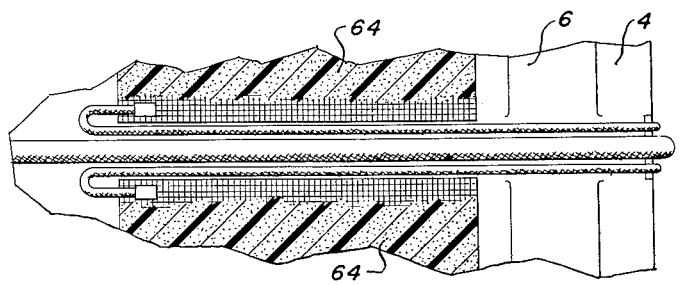
Fig. 5 is a fragmentary view showing heating means which may be used with the device of the present invention.

For best results it is desirable that the fluid be maintained at substantially constant temperature. Any suitable heating means may be provided for achieving this result. For example, a heater strip 64 (Fig. 5) may extend along suitable portions of the outer casing 4 and be connected, through one or more thermostat elements 63 (Figs. 1 and 4) with some external current supply such as batteries or the like (not shown). Wiring for the switch 20 and thermostats 63 may extend through a guard 67 and connector block 68 and terminate in contact pins (not shown) of some suitable connector plug 69.

Figure 6:
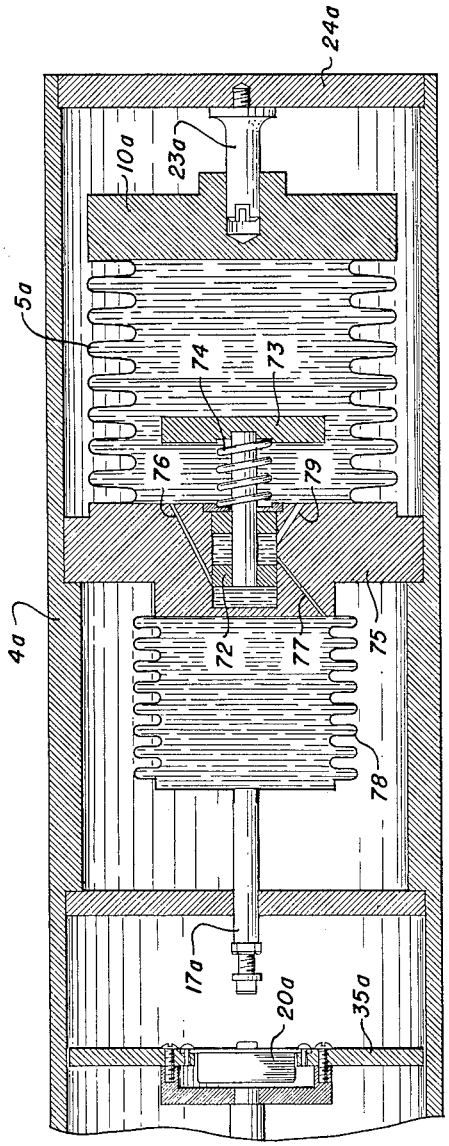
Fig. 6 is a longitudinal sectional view showing another form of the invention.

In the modified form of Fig. 6 the accelerometer is shown with bellows in tandem arrangement rather than one within the other, and provided with a two-way valve 72 replacing the normally open aperture 12 of Fig. 1. The Fig. 6 bellows will normally be mounted in a vehicle with the mass 10a disposed toward the front of the vehicle so that the tendency of it is to move toward the left and compress the bellows 5a as the vehicle accelerates. When the vehicle accelerates a force is also applied to a smaller mass 73 which compresses a spring 74 that is secured to both the apertured plates 75 and smaller mass 73; the effect is to move the valve 72 so that the two spaced shoulder portions thereof uncover ports and provide a passageway through conduits such as 76, 77 between the bellows 5a and the bellows 78. Under acceleration, movement of the large mass compresses the bellows 5a and causes fluid to flow through the conduits 76, 77 into the bellows 78 so as to change its length and move its trigger rod 17a toward the switch 20a to operate it after the desired conditions of acceleration and time have been applied. If the accelerating force is removed, the spring 74 moves the valve 72 to an intermediate position in which its shoulder portions cover the ports and the bellows 78 may remain at its final length, indicating constant velocity.

If a decelerating force is applied, small mass 73 moves the valve 72 to the right, to the illustrated position, and conduits such as 77, 79 are put in communication so that fluid may return from the bellows 78 to the bellows 5a in response to elongation of bellows 5a by movement of mass 10a; resulting decrease in length of the bellows 78 may be used to indicate a decreasing velocity. If the length of the bellows 78 is fed to an integrator, distance will be the result.

Employing an output bellows of lesser cross section than the operating bellows which is connected therewith is highly desirable as it provides for obtaining an amplification of output and consequently improved accuracy in results. In some instances it may, however, be desirable to utilize bellows 5a, 78 of the same diameter.

The form of the invention shown in Figs. 1 through 5 is preferred to that of Fig. 6, as the former provides a compact and highly sensitive accelerometer which may be readily set to desired conditions and is of substantially foolproof construction.

It will be seen that the present invention provides a new and improved accelerometer of relatively simple and rugged construction which is adapted to furnish an amplified output for improved accuracy. Improved setting means is provided for preselecting the instant of operation of a switch or some other mechanism. While the invention has been described chiefly with reference to its use for closing a switch, it will be understood that it may also be employed for adjusting the effective position of a potentiometer so as to obtain a variable output depending upon the position of the output bellows. The device is of rugged construction and well adapted to withstand any rough conditions or usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. In a device of the character described, the combination of a pair of bellows, a member operatively intermediate said bellows having an aperture adapted to receive fluid from one bellows and conduct it to a location adjacent the other bellows, means including a casing for fixedly supporting said member with respect to each bellows of said pair and for enclosing said other bellows, said other bellows being closed against admission of said fluid thereinto and said aperture communicating with the interior of said casing and exterior of said other bellows to thereby facilitate at least partial collapse of the bellows in response to entry of fluid into said casing, a mass attached to said one bellows at a location spaced from said fixedly supported apertured member and free to move toward said member to at least partially collapse said one bellows from a normal expanded condition and expel fluid therefrom through said aperture to a location contiguous to said other bellows to thereby subject said other bellows to pressure of the expelled fluid and vary its effective length.

2. A device as claimed in claim 1, in which said other bellows is of lesser diameter than said one bellows.

3. In a device of the character described, the combination of a pair of bellows one of which is of larger diameter than the other, a member operatively intermediate said bellows having an aperture adapted to receive fluid from the larger diameter bellows and conduct it to a location adjacent the other bellows, means for fixedly supporting said member with respect to each bellows of said pair, and a mass attached to said larger diameter bellows at a location spaced from said fixedly supported apertured member and free to move toward said member to at least partially collapse said larger diameter bellows from a normal expanded condition and expel fluid therefrom through said aperture to a location contiguous to said other bellows to thereby subject said other bellows to pressure of the expelled fluid and vary its effective length 4. In a device of the character described, the combination of a pair of bellows, a member operatively intermediate said bellows having an aperture adapted to receive liquid from one bellows and conduct it to a location adjacent the other bellows, means for fixedly supporting said member with respect to each bellows of said pair, a recessed mass attached to said one bellows at a location spaced from said fixedly supported apertured member and free to move toward said member to at least partially collapse said one bellows from a normal expanded condition and expel liquid therefrom through said aperture to a location contiguous to said other bellows to thereby subject said other bellows to pressure of the expelled liquid and vary its effective length, a guide member projecting into the recess of said mass to guide the mass during movement thereof, switch means having a portion adjacent said other bellows and adapted to be actuated in response to movement of said other bellows to control an electric circuit, and means for varying the spacing of said switch means with respect to said other bellows.

5. A device of the character described comprising a pair of bellows with one bellows of the pair at least partially enclosing the other, a member operatively intermediate said bellows having an aperture adapted to receive fluid from said one bellows and conduct it to a location adjacent said other bellows, means fixedly supporting said member, a mass operatively connected to said one bellows at a location spaced from said apertured member and movable toward said member to at least partially collapse said one bellows and expel fluid therefrom through said aperture to a location contiguous to said other bellows to subject the latter to pressure and vary its effective length.

6. A device of the character described comprising a pair of bellows with one bellows of the pair at least partially enclosing the other and providing inner and outer bellows, a casing within said outer bellows and encircling said inner bellows having an aperture therethrough adapted to facilitate passage of fluid from the interior of said one bellows to the interior of said casing and exterior of said inner bellows, a mass operatively connected to said outer bellows at a location spaced from said casing and movable toward said casing to at least partially collapse said outer bellows and expel fluid therefrom through said aperture to the interior of said casing to subject the inner bellows to pressure and vary its effective length.

7. A device as claimed in claim 6, in which there is provided an outer casing enclosing said inner and outer bellows, said mass has a recess therein, a guide member is secured to said outer casing and projects into said recess to guide the mass during movement thereof, an operating member is secured to a movable portion of the inner bellows to contact a circuit-controlling means in response to movement of the inner bellows, and circuit-controlling means is supported by said outer casing adapted to be operated by said circuit-controlling member.

8. A device as claimed in claim 7, in which means is provided for varying the spacing of the circuit-controlling means from said operating member.

9. A device as claimed in claim 7, in which means including a threaded adjusting ring supported by said outer casing is provided for varying the spacing of the circuit-controlling means from said operating member.

10. A device of the character described comprising a pair of bellows with one bellows of the pair at least partially enclosing the other and providing inner and outer bellows, a casing at least partially within said outer bellows and encircling said inner bellows having an aperture therethrough providing communication between the interior of the outer bellows and the interior of said casing, a mass secured to said outer bellows at a location spaced from said casing and movable toward said casing to at least partially collapse said outer bellows and expel fluid therefrom through said aperture to the interior of said casing to subject the inner bellows to pressure and vary its effective length, and means secured to a movable portion of said inner bellows and movable therewith adapted to operate circuit-controlling means.

11. A device as claimed in claim 10, in which said means comprises an elongated member disposed within the confines of said inner bellows and secured thereto adjacent a movable end of the inner bellows.

12. A device as claimed in claim 10, in which said means comprises a rod disposed within the confines of said inner bellows and secured thereto adjacent a movable end of the inner bellows, and a guide member projects into said inner bellows and encircles said rod for supporting and guiding the rod.

13. In a device of the character described, the combination of a pair of bellows, a member operatively intermediate said bellows having an aperture adapted to receive fluid from one bellows and conduct it to a location adjacent the other bellows, a valve carried by said member for controlling said aperture, a mass secured to said valve for actuating said valve, resilient means operatively intermediate said mass and valve adapted to urge said mass away from the apertured member, means for fixedly supporting said member with respect to each bellows of said pair, a mass greater than said first-mentioned mass attached to said one bellows at a location spaced from said fixedly supported apertured member and free to move toward said member to at least partially collapse said one bellows from a normal expanded condition and expel fluid therefrom through said aperture to a location contiguous to said other bellows to thereby subject said other bellows to pressure of the expelled fluid and vary its effective length.

References Cited in the file of this patent

UNITED STATES PATENTS

| | | |
|---|---|---|
| 2,140,954 | Frazee | Dec. 20, 1938 |
| 2,317,028 | Chappel et al. | Apr. 20, 1943 |
| 2,466,071 | Barnes et al. | Apr. 5, 1949 |
| 2,484,165 | Hathaway | Oct. 11, 1949 |